United States Patent [19]

Peterson

[11] 4,368,050
[45] Jan. 11, 1983

[54] COUPLING

[75] Inventor: Robert R. Peterson, Hudson, Mass.

[73] Assignee: Barry Wright Corporation, Newton Lower Falls, Mass.

[21] Appl. No.: 185,028

[22] Filed: Sep. 8, 1980

[51] Int. Cl.³ .............................................. F16D 3/52
[52] U.S. Cl. .................................... 464/83; 464/139; 464/906
[58] Field of Search .................. 464/139, 140, 83, 85, 464/906

[56] References Cited

U.S. PATENT DOCUMENTS

| | | | |
|---|---|---|---|
| 1,682,444 | 8/1928 | Trumpler | 464/139 |
| 1,843,211 | 2/1932 | Davis | 464/140 |
| 2,094,901 | 10/1937 | Monzee et al. | 464/139 |
| 2,427,237 | 9/1947 | Suczek | 464/906 |
| 4,208,889 | 6/1980 | Peterson | 464/138 |

Primary Examiner—Ira S. Lazarus
Assistant Examiner—Magdalen Moy
Attorney, Agent, or Firm—Milton E. Gilbert; Gary E. Ross

[57] ABSTRACT

An improved coupling device for joining two rotatable members which may undergo misalignment is disclosed. The device includes a plurality of balls for operatively coupling the two rotatable members. One disclosed embodiment of the coupling device is a plunging joint and another disclosed embodiment of the coupling device is a fixed joint. The joints can be used independently or, alternatively both types of joints can be combined in tandem to provide an improved transmission drive. Each joint is connected between a driving member and a driven member. The coupling device comprises laminated bearing units of alternating layers of resilient and nonextensible materials. The units are designed to carry in compression torque loads transmitted through the device. The units of the plunging joint accommodate in shear (1) relative axial misalignment or plunging motion and/or (2) relatively small angular motion between the driving and driven members to which the joint is connected, while the units of the fixed joint accommodate in shear relative angular misalignment or pivotal motion between the driving and driven members to which the joint is connected from the respective rotation axes of the driving and driven members.

23 Claims, 9 Drawing Figures

COUPLING

The present invention relates generally to flexible mechanical drive coupling devices, and more particularly to an improved constant velocity coupling.

Many mechanical drive coupling devices have been designed for transmitting rotary motion with a constant velocity ratio between two shafts while allowing the relative positions of the shafts to vary. Devices which are capable of performing this task are commonly called constant velocity or homokinetic joints or couplings. For an analysis of homokinetic couplings see Gilmartin, M. J., et al; "Displacement Analysis of Spatial 7R Mechanisms Suitable for Constant Velocity Transmission Between Parallel Shafts"; Transactions of the ASME; *Journal of Mechanical Design;* Volume 101; October 1979; pp. 604–613. There has been an increased demand for such couplings in recent years due to the widespread application of such couplings. For example, they are used with various types of industrial machinery as well as motor driven vehicles, including automobiles, marine vehicles, air vehicles such as helicopters, etc. More recently, a great deal of interest has developed in such couplings for front wheel drive in automobiles so that torque can be delivered from the engine to the front wheels at a constant velocity.

One particular type of coupling which has received a great deal of attention is the type which utilizes balls to operatively couple a driving shaft to a driven shaft. Such couplings are disclosed in (1) Miller, Fred F.; "Constant Velocity Universal Ball Joints—Their Applications in Wheel Drives"; *Society of Automotive Engineers,* Technical Paper Series; No. 650010, 1965, pp. 63–75; and (2) Girguis, S. L., et al; "Constant Velocity Joints and Their Applications"; *Society of Automotive Engineers,* Technical Paper Series; No. 780098, 1978; pp. 1–17.

Generally, the ball joints are divided into two types, the fixed ball joints which accommodate, in particular, angular misalignments between the driving and driven shafts, and the plunging ball joints which typically accommodate axial misalignment and often accommodate some angular misalignment of the shafts. The fixed ball joints often fix the ends of the shafts so that neither are axially movable. The plunging ball joints, on the other hand typically are designed to provide relative end movement of at least one shaft along its axis. Both types can be used to couple a driving shaft to a load. For example, in front or rear drive independent suspension systems, the engine is coupled to the driven wheel through an intermediate shaft. A fixed joint is typically provided at the outboard end of the intermediate shaft nearer the driven wheel to accommodate greater angular misalignments, while a plunging joint is typically provided at the inboard end, nearer the engine, where smaller angular misalignments occur while allowing the length of the intermediate shaft between the joints to vary due to telescoping loads applied to the coupling.

The prior art ball joints used in front or rear drive suspension systems are typically designed so that the driving and driven shafts always rotate about axes which intersect one another and the balls coupling the driving and driven shafts are radially spaced from and circumferentially distributed about the intersection point of the axes. The balls are movable in spherically-curved grooves so that the driving and driven shafts can pivotally move with respect to one another about the common intersection point of the axes. In order to maintain constant velocity between the driving and driven shafts, the ball grooves must be constructed in a manner such that the centers of all the drive balls lie in a common plane (sometimes referred to as the "homokinetic" plane) which extends through and always bisects the common intersection point of the rotation axes.

The type of ball groove design is an important feature of many prior art ball joints. For a certain range of angular misalignments between the driving and driven shafts the spherical center of curvature of the grooves themselves can be designed to maintain the balls in the homokinetic plane. Alternatively, ball cages are used for such purposes. The cross-sectional shape of the grooves can also be important. For example, the so-called Birfield joint, which has been used in many European automobiles, is identical to the Rzeppa joint, except the cross-sectional contour of each groove is elliptical instead of circular. It is claimed that each design has its distinct advantages.

The type of ball groove design determines whether the coupling is a fixed joint or a plunging joint. End motion in the latter can be accomplished with several different joint designs depending on the amount of both angular and plunging movements desired. For long movements of approximately 2–3 inches, for example, ball splines are often designed into the prior art couplings to provide the range of plunging motion described. For shorter end movements prior art plunging ball joint designs are available which can accommodate considerable end motion utilizing the same balls that are used for transmitting angular torque through the joint. The plunging joints are also capable of accommodating some angular misalignment. Ranges of maximum angle of angular misalignment, combined with total slip, vary depending on joint size as well as other factors. Angles as high as 18 degrees, combined with 1.5 inches total axial travel, can be accommodated in the larger automotive joints. Because of the design of many of the ball joints, they require relatively close manufacturing tolerances, and accordingly the manufacturing costs of these joints are relatively high. Further, the metal-to-metal contact between the various moving parts generates friction and heat and thus energy losses, and transmits noise and vibration. Often backlash will occur in response to low reverse torques.

The durability of the prior art ball joints is largely dependent upon joint size, sound metallurgy, tight manufacturing tolerance controls, correct lubricant, and integrity of the boot seal which maintains adequate lubrication in the joint.

Adequate lubrication is critical to the operation of a coupling of the prior art couplings described. In coupling applications such as in front drive suspension systems, where little angular misalignment is provided during normal operations, the joint will not necessarily immediately fail upon failure of the boot seal so long as it is replaced relatively quickly. However, lubricant can easily dry up and/or become contaminated leading to premature failure of the joint.

A general object of the present invention is to substantially eliminate or reduce the problems of the prior art couplings.

Other more specific objects of the present invention are to provide an improved joint which eliminates all lubrication requirements, substantially eliminates all friction and heat between the various bearing surfaces, greatly reduces power losses, substantially eliminates generating or transmitting noise and vibration, relaxes manufacturing tolerance requirements, is more economical to manufacture, and substantially eliminates backlash at low reverse torques.

And another object of the present invention is to provide an improved flexible coupling device for connecting a rotatable driving member to a rotatable driven member in which the range of subcritical and supercritical speeds respectively below and above any whirl speed (speed at resonant frequency of the assembly, or harmonics of the same) can be predetermined and thereby adjusted as the particular application requires.

These and other objects of the present invention are provided by an improved coupling device comprising a driving member rotatable about a first axis and a driven member rotatable about a second axis. First means rotates with the driving member about the first axis and includes a first plurality of grooves radially spaced from and circumferentially distributed around said first axis. Second means rotates with the driven member about the second axis and includes a second like plurality of grooves, each disposed radially opposite to a corresponding one of the grooves of the first plurality in a mutually confronting manner. A like plurality of balls are each disposed in a corresponding one of the first plurality of grooves and the opposing one of the second plurality of grooves. First laminated bearing means comprising alternating layers of resilient and nonextensible materials is disposed between the driving member and the first means. The first laminated bearing means, carries in compression torque transmitted from the driving member to the driven member and carries in shear, shearing motion between the driving member and the first means. Second laminated bearing means comprising alternating layers of resilient and nonextensible materials is disposed between the driven member and the second means. The second laminated bearing means carries in compression torque loads transmitted from the driving member to the driven member and carries in shear, shearing motion between the driven member and the second means. In the preferred fixed joint embodiment of the coupling device, the first and second laminated bearing means are designed to be in shear in response to relative angular misalignment between the driving and driven members from their respective rotation axes. In the preferred plunging joint embodiment of the coupling device the first and second laminated bearing means are designed to be in shear in response to relative axial misalignment or plunging motion between the driving and driven members from their normal operating positions and/or relatively small angular motion with respect to their relative angular positions. Both the fixed and plunging joints can be employed together in tandem in a power transmission train to provide an improved constant velocity coupling, as described hereinafter.

Other features and many attendant advantages of the invention are disclosed in or rendered obvious by the following detailed description taken in connection with the accompanying drawing wherein.

Figure 1:
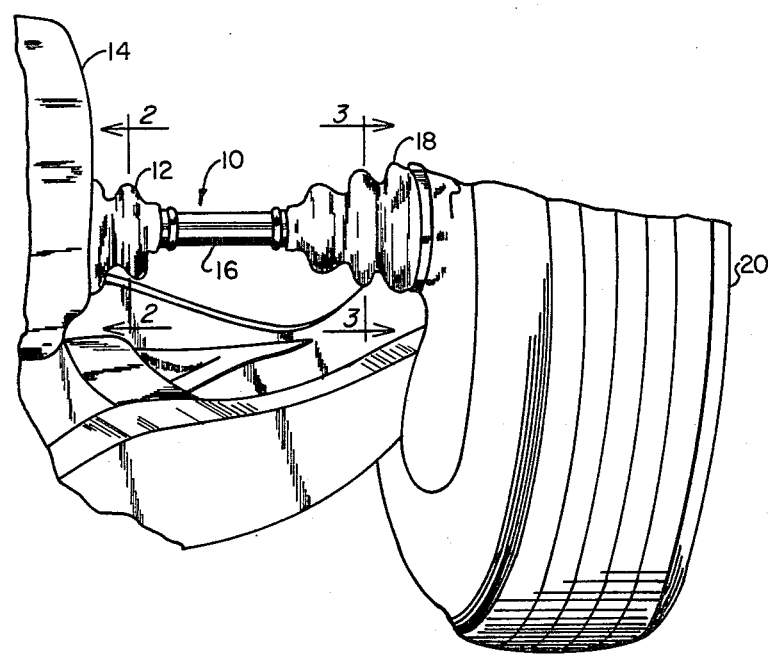
FIG. 1 is a perspective view partially cut away of the front end of an automobile showing a coupling incorporating the principles of the present invention.

Referring to FIG. 1, the front end of a front-wheel drive automobile is shown as including a coupling device 10 including (1) a plunging joint 12 for transmitting torque from the engine 14, and in particular a differential gearing (not shown) to an intermediate shaft member 16, and (2) a fixed joint 18 for transmitting torque from the intermediate shaft member 16 to the front wheel 20. Front wheel drive systems to the extent described are well known and found in many automobiles.

In accordance with the present invention an improved coupling device 10 is provided by utilizing the preferred embodiment of the plunging joint of the present invention, shown as joint 12 in tandem with the preferred embodiment of the fixed joint of the present invention shown as joint 18. It should be appreciated that the preferred embodiments of the fixed and plunging joints need not be used in tandem but have many separate applications calling for one or the other of the joints. Furthermore, although the present invention is shown in a front drive of an automobile it is equally applicable to many other systems including industrial machinery, marine vehicles such as motor power boats, and air vehicles such as helicopters. Although all of the embodiments are shown and described as having the rotation axes of the driving and driven members coaxially aligned they will operate equally as well when the axes are angularly misaligned.

Figure 2:
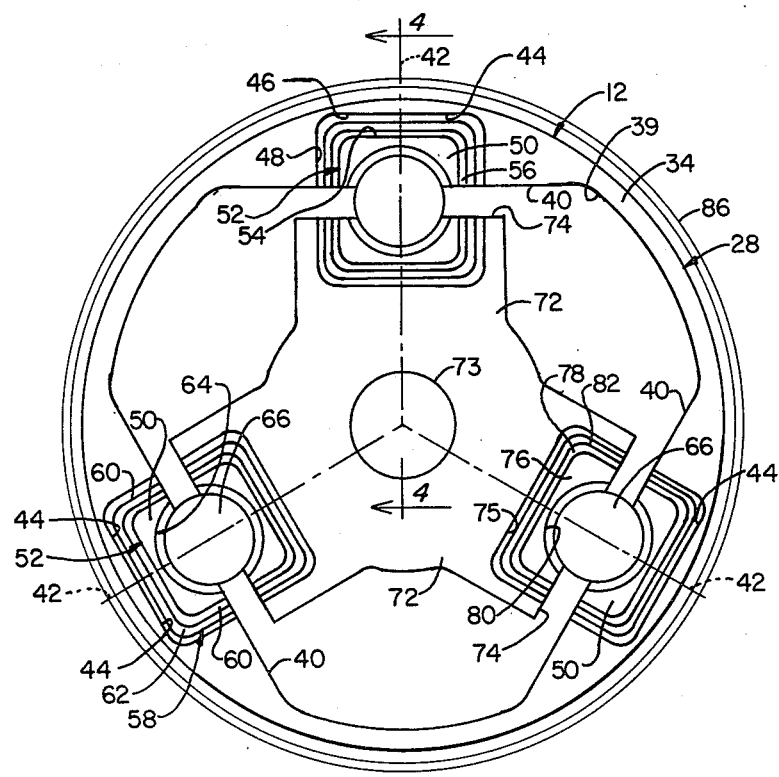
FIG. 2 is an axial cross-sectional view taken along line 2—2 in FIG. 1.
Figure 3:
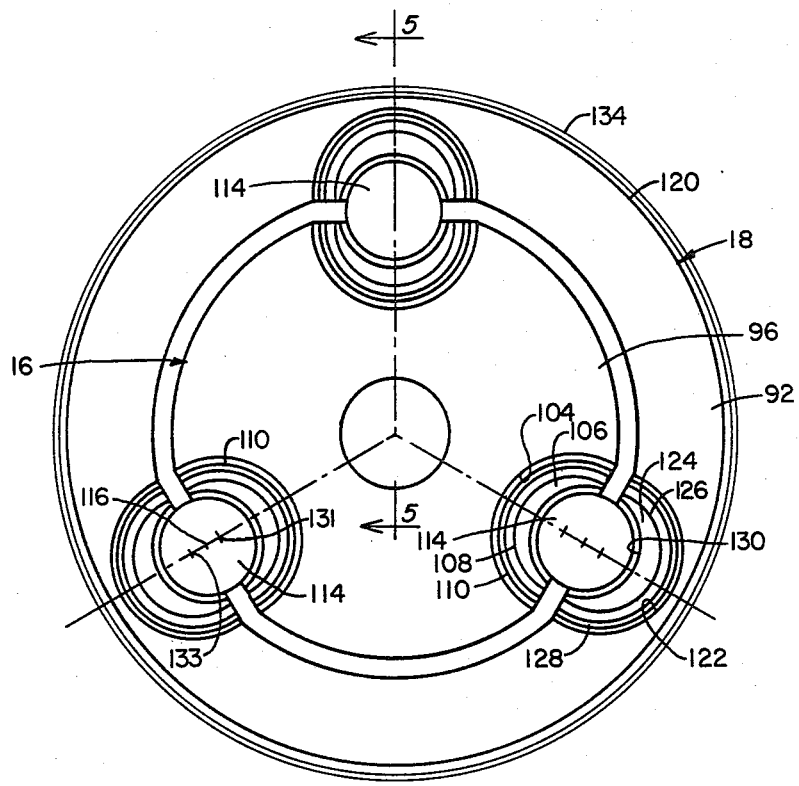
FIG. 3 is an axial cross-sectional view taken along line 3—3 in FIG. 1.
Figure 4:
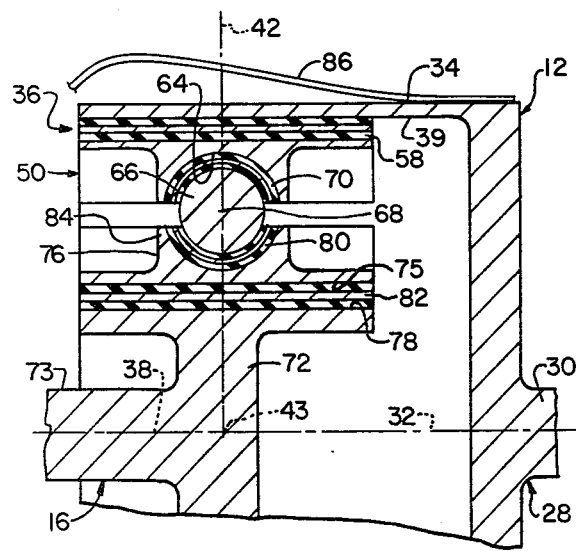
FIG. 4 is a longitudinal cross-sectional view, partially cut away, taken along line 4—4 in FIG. 2.
Figure 5:
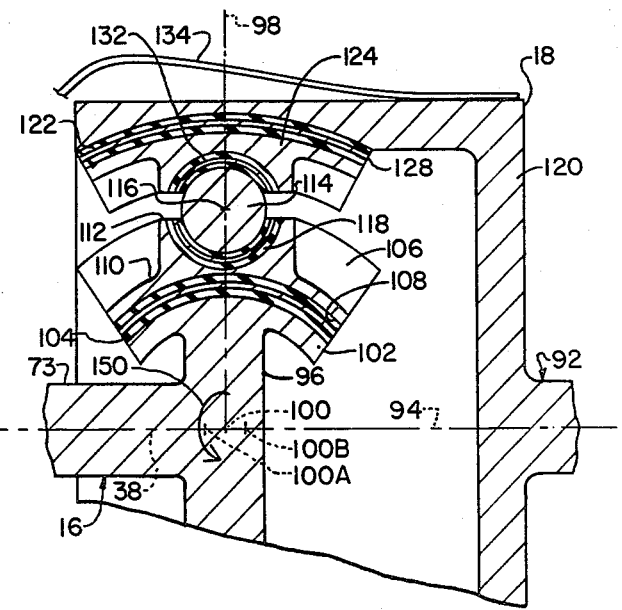
FIG. 5 is a longitudinal cross-sectional view, partially cut away, taken along line 5—5 in FIG. 3.

The preferred embodiment of the plunging joint 12 of the preferred coupling device 10 is shown in detail in FIGS. 2 and 4, while the preferred embodiment of the fixed joint 18 of the preferred coupling 10 with its specific features, is shown in detail in FIGS. 3 and 5.

Referring to the plunging joint 12 illustrated in FIGS. 2 and 4, the driving member 28, typically includes a shaft 30 mounted for rotation about the rotation axis 32. In the front wheel drive system of FIG. 1, driving member 28 is adapted to carry torque loads provided by engine 14 in a manner well known in the art. Driving member 28 also preferably includes a cylindrical cup end section 34 integrally formed with the shaft 30, although it will be appreciated that the cylindrical cup end section 34 can be separately made of one or more elements suitably secured to the shaft 30 so that the end section 34 rotates with the shaft 30, coaxially about the rotation axis 32. The end section 34 is open at its end 36 opposite shaft 30 so as to receive in an operative manner the driven member (in the system of FIG. 1 the driven member is intermediate shaft member 16), the latter being rotatably mounted about axis 38.

As shown in FIG. 2 the internal wall 39 of cylindrical end section 34 is provided with a plurality of flat surfaces 40 each of which lie in a plane preferably parallel to the rotation axis 32. Each flat surface 40 is disposed with respect to a corresponding radial line 42 extending normally from the rotation axis 32 such that (1) the radially line bisects and is preferably perpendicular to the surface 40, (2) the radial lines 42 and thus the surfaces 40 are equiangularly disposed around axis 32, and (3) the surfaces 40 are equally spaced along their respective radial lines 40 from axis 32. Each flat surface 40 is provided preferably with a cylindrically grooved bearing surface 44 facing the axis 32 and symmetrically disposed about the corresponding radial line 42 so that the rotation axis 38 and the respective radial line 42 lie in the center plane of the groove surface 44. The latter extends from the center point 43, which in turn defines the common intersection point of axes 32 and 38 when the driving and driven members are angularly misaligned. Preferably, the cylindrically grooved bearing surface 44 has a rectangular, U-shaped radial cross section and a cylindrical axial cross-section. Surface 44 includes a substantially flat, radially-outward surface portion 46 being disposed normally to the respective radial line 42, and substantially flat side surface portions 48 extending generally parallel to and equally spaced from the respective radial line 42. Each groove bearing surface 44 functions as a race for the outer ball retaining element 50 which rotates with the driving member 28. Each element 50 is provided with an opposing convex rectangular, U-shaped, radial cross-sectioned, cylindrical bearing surface 52 adapted to mate with bearing surface 44 and having a flat outer surface portion 54 spaced from and opposing the surface portion 46 of the surface 44, and substantially flat side surfaces 56 spaced from and opposite the side surface portions 48 of the surface 44.

Laminated bearing means 58 is disposed between and secured, preferring by bonding, to the opposing bearing surface portions of the surfaces 44 and 52 and accordingly takes the general shape of those surfaces, i.e., is of a rectangular U-shaped radial cross-section and of a cylindrical axial cross-section. Laminated bearing means 58 comprises a plurality of alternating layers 60 and 62 respectively of resilient and substantially nonextensible materials. Each bearing means 58 preferably is a "high compression laminate" bearing unit. The resilient layers 60 are made of an elastomeric material, such as rubber or certain plastics, while the nonextensible layers of layers 62 are made for example, of reinforced plastic, metal or a metal alloy such as stainless steel. The alternating layers are bonded together, and to surfaces 44 and 52 by, for example, a suitable bonding cement.

As shown in FIGS. 2 and 4, each ball retaining element 50 is also provided with a groove in the form of a spherical seat 64 for receiving the spherical ball 66. The latter is of a type well known in the art for use in prior art ball joint couplings. Ball 66 as illustrated in FIG. 4, has a geometric center 68 which lies on the corresponding radial line 42 and a radius of curvature substantially the same as the radius of curvature of the spherical seat 64. Spherical laminated bearing means 70 also comprising alternating layers of resilient and nonextensible material and preferably a high compression laminate bearing unit is bonded between each groove 64 and ball 66.

Each ball 66 operatively couples the driving member 28 to the driven member, in this case the intermediate shaft member 16. Member 16 preferably includes a plurality of arms 72 secured to the end of shaft 73. As shown in FIG. 2 each arm 72 extends radially outwardly from the axis 38 along a corresponding radial line 42, within the cylindrical cup end section 34. The outer radial end of each arm 72 is provided with a flat surface 74 parallel to and spaced from the surface 40 of end section 34. Each outer surface 74 is provided with a rectangularly U-shaped cylindrically-grooved bearing surface 75 preferably identical to and disposed opposite from a respective cylindrically grooved bearing surface 44 of the cylindrical cup end section 34. Each cylindrically grooved bearing surface 75 functions as a race for the inner ball retaining element 76, the latter being identical to the outer ball retaining element 50 and including a convex cylindrical bearing surface 78 and a groove in the form of spherical seat 80.

As shown best in FIG. 4, second laminated bearing means 82, identical to the first laminated bearing means 58, is disposed between and secured, preferably by bonding, to the opposing bearing surface portions of the bearing surfaces 75 and 78.

Further, the spherical seat 80, identical to the spherical seat 64 of the retaining element 50, receives the portion of ball 66 opposite the portion disposed in the groove 64. Spherical laminated bearing means 84 identical to spherical laminated bearing means 70 is bonded between the groove 80 and the ball 66.

The spacing between each flat surface 40 and the opposing flat surface 72 is such that the geometric center 68 of the corresponding ball 66 disposed therebetween will be equidistant from the planes defined by the two surfaces. The rubber boot 86 can be used to surround the joint if desired; however, it will be appreciated that since lubrication is not needed, the boot is not essential.

Referring now to FIGS. 3 and 5, the preferred fixed ball joint 18 includes a driving member which in the system shown in FIG. 1 is the intermediate shaft member 16, and a driven member 92 rotatable about the axis 94. The driven member in the system shown in FIG. 1 is directly coupled to the wheel 20.

The end of the driving member, shaft member 16, is provided with a disk 96 integrally formed or otherwise secured to the end of the rotating shaft 73 so that the disk 96, coaxial with the rotation axis 38, rotates about that axis. The peripheral edge of the disk 96 is provided with a plurality of flanges 102, each disposed symmetrically about a radial line 98 extending from the center point 100 on the rotation axis 38 of the shaft member 16 in the center of the disk 96, so as to be equiangularly-spaced around the rotation axis 38 and equally radially spaced from the point 100. Point 100 forms the common intersection point of the rotation axes 38 and 94 when the driving and driven members are angularly misaligned. The outer peripheral surface of each flange 102 defines a grooved bearing surface or race 104 which has a semi-circular U-shaped radial cross-section (as seen in FIG. 3) preferably open at its outer radial position and follows in axial cross-section a circular arcuate path about the center point 100 (as seen in FIG. 5) in a plane extending through the axis 38 and the respective radial line 98. An inner ball retaining element 106 has a convex surface 108 matching the grooved surface of race 104 so as to pivotally move in the race 104 about point 100 in a plane defined by axis 38 and the corresponding radial line 98. Laminated bearing means, preferably in the form of a high compression laminated bearing unit 110, has the same geometrical radial and axial cross-sectional shapes as groove surface of race 104 and convex surface 108. Unit 110 is secured between the groove surface of race 104 and the surface 108 by, for example, bonding the unit in place. Ball retaining element 106 also includes a groove in the form of spherical seat 112 for receiving the ball 114. The seat and ball are respectively similar to seat 64 and ball 66 of the plunging joint of FIGS. 2 and 4 with each ball 114 having a geometric center 116 disposed on the corresponding radial line 98. Similarly, spherical laminated bearing means in the form of unit 118 (substantially identical to that of the spherical bearing units 70 and 84 of FIGS. 2 and 4) is secured between the ball 114 and seat 112. Each ball 114 operatively couples the driving member, intermediate member 16 to the driven member 92.

The coupled end of driven member 92 is similar to the driving member 28 of FIGS. 2 and 4. Specifically, the driven member 92 includes a cylindrical cup end section 120 integrally formed or otherwise secured to the rotating shaft of the driven member 92 so that the end section 120 rotates about the axis 94. The internal wall of the end section 120 is provided with a plurality of groove surfaces to form races 122. Each race 122 has a semicircular U-shaped radial cross-section (as seen in FIG. 4) preferably open at its innermost radial position so as to oppose the race 104 of the driving member, intermediate member 16. Each race is symmetrically disposed with respect to a corresponding radial line 98, and follows in its axial cross-section a circular arcuate path about the center point 100 in the same plane as the path followed by the race 104. A ball retaining element 124 is provided for each race 122 and has a convex surface 126 matching the grooved surface of the race 122 so as to pivotally move in the race about the point 100. Laminated bearing means, preferably in the form of a high compression laminated bearing unit 128, is shaped such that it is disposed and secured between the surface of each race 122 and the convex surface 126 of the corresponding ball retaining element 124. Ball retaining element 124 also includes in its radially inward surface a groove in the form of spherical seat 130 for receiving the ball 114 such that the ball retaining elements 124 remain spaced from one another. Laminated bearing means 132 substantially identical to that of the bearing unit 118 is secured between the ball 114 and the seat 130. A rubber boot 134 can be used to surround the joint if desired.

In the design shown in FIGS. 3 and 5, the center of the curvature of each bearing unit 110 and 128 in its radial cross section through the center of the corresponding spherical ball 114 is shown respectively at 131 and 133 in FIG. 3. It is clear that these centers of curvature are respectively inwardly and outwardly radially spaced from the center 116 of the ball so as to insure that the torque transmission from the intermediate shaft 16 to the driven member 92 does not produce rotation of the ball.

The particular design of each of the laminated bearing means described in both the high and low angle ball-joint embodiments is largely dependent upon the intended use. The size, thickness and number of layers of each bearing unit and the durometer of each layer of elastomeric material depends, for example, on the particular compression loads to be expected. The advantages of such bearing units are described in my U.S. Pat. No. 4,208,889 issued June 24, 1980. Generally, by utilizing such bearing units, undesirable vibration can be at least partially dampened and noise, as well as vibration-induced wear and stress reduced. Further, due to the resiliency of the elastomeric material, each bearing unit provides counteracting restoring forces to uneven compression and shearing loads. Of importance, use of such laminated bearing means eliminates the costly needs associated with providing lubrication between the various bearing surfaces.

In operation when torque is being transmitted through the plunging joint 12 described in FIGS. 2 and 4, and the rotation axes 32 and 38 of the respective shafts remain coaxially aligned as shown, an equal compressive load is carried by each of the laminated bearing means 58.

Similarly, an equal compressive load will be carried by each of the second laminated bearing units 82, by each of the spherical laminated bearing units 70, and by each of the spherical laminated bearing units 84. If any angular misalignment occurs between the driving and driven members, a shear load will be applied to the laminated bearing units 70 and 84 resulting in the retaining element 50 pivoting slightly about point 68 relative to retaining element 76 with each complete revolution of the members about their respective axes. The applied load is a function of the angular position of each of the bearing units as is well known in the art.

Due to the nature of such laminated bearing means (to provide restoring forces when subjected to loads of this type), the shafts will tend to move back into axial alignment. Further, since such laminated bearing units 58 and 82 provide substantially less resistance to shearing motion, the joint 12 is capable of accommodating plunging motion, where shafts 16 and 30 move relative to one another, axially along their respective rotation axes 38 and 32. The axial positions of the shafts will be restored due to the restoring force provided in each of the bearing units 58 and 82 in response to shear.

When torque is transmitted through the high angle fixed ball joint 18 described in FIGS. 3 and 5, the applied torque, is carried in compression equally by each of the laminated bearing units 110 and equally by each of the laminated bearing units 128. Axial misalignment of the shafts can occur, for example when wheel 20 of FIG. 1 moves up and down in response to the road surface while movement of the body of the automobile is dampened. Such misalignment occurs when one of the shafts pivots about the center point 100 (shown in FIGS. 3 and 5) relative to the other shaft. In this regard point 100 will always form the common point of intersection of rotation axes 38 and 94. This pivoting motion is carried by the units 110 and 128 in shear as the shafts rotate about their respective axes. In this regard all of the units 110 and 128 are preferably designed to have the same angular spring rate about the pivot point 100 in the plane defined by the path of the groove surfaces 104 and 122, (as indicated by arrow 150 in FIG. 5) so as to provide a constant velocity coupling whereby the centers 116 of balls 114 will remain in the homokinetic plane when angular misalignment occurs.

Figure 6:
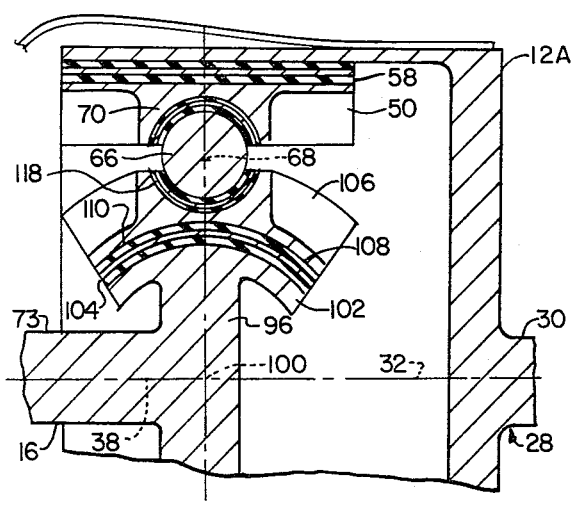
FIG. 6 is a partially cut away, longitudinal, cross-sectional view showing an alternative embodiment to the joints shown in FIGS. 2-5.
Figure 7:
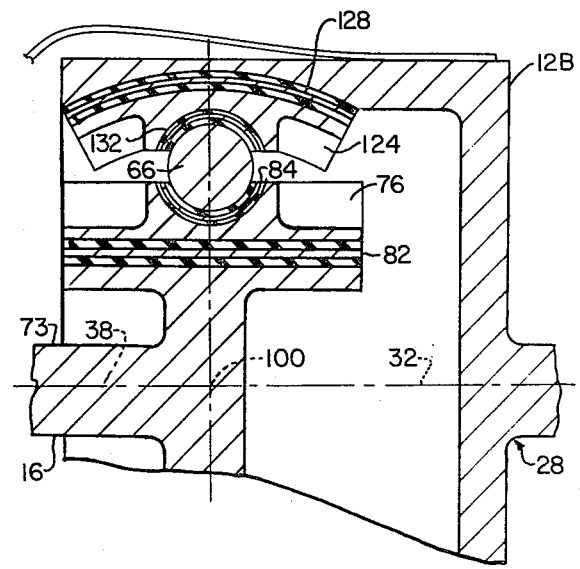
FIG. 7 is a partially cut away, longitudinal, cross-sectional view showing another alternative embodiment to the joints shown in FIGS. 2-5.

The device 10 including joints 12 and 18 shown in FIG. 1 thus provides an effective coupling for transmitting torque between engine 14 and wheel 20. Joint 12, while accommodating some angular misalignment, will also accommodate all plunging motion due to relative changes in the spacing between engine 14 and wheel 20 by accommodating relative changes in the shaft length of the intermediate shaft member 16 between the two joints. Joint 18, however, will accommodate angular misalignment while maintaining constant velocity coupling between the shaft 16 and wheel 20.

Where it is desirable that plunging joint 12 accommodate larger angular misalignments, the structure of FIGS. 2 and 4 can be modified as shown in FIGS. 6 or 7.

In FIG. 6, the driving member 28, ball retaining elements 50, laminated bearing units 58 and 70 and balls 66 of the joint 12A are substantially identical to the corresponding elements of joint 12 of FIGS. 2 and 4. The driven member 16, inner ball retaining elements 106, and laminated bearing units 110 and 118 are substantially identical to the corresponding elements of joint 18 of FIGS. 3 and 5. In this manner plunging motion is carried in shear by units 58 to allow relative axial movement between the driving and driven members along their respective axes 32 and 38. The axial motion about center point 100 can be carried in shear by the bearing units 110.

In FIG. 7, the driving member 28, ball retaining elements 124, laminated bearing units 128 and 132 of the joint 12B are substantially identical to the corresponding elements of joint 18 of FIGS. 3 and 5. The driven member 16, inner ball retaining elements 76 and laminated units 82 and 84 are substantially identical to the corresponding elements of joint 112 of FIGS. 2 and 4. In this manner plunging motion is carried in shear by bearing units 82 to allow relative axial movement between the driving and driven members along their respective axes 32 and 34. Angular misalignment about the intersection point 100 can be provided wherein the axial motion about center point 100 can be carried in shear by bearing units 128. The geometry shown in FIG. 7 achieves an additional degree of stiffness which is beneficial for handling axial motions, and, at the same time, it equalizes stiffness for angular misalignment.

As a further modification to the fixed joint shown in FIGS. 3 and 5, the arcuate path of each of the laminated bearings 110 can be axially displaced along the axis 38, for example at point 100A or 100B shown in FIG. 5.

The above-described coupling together with its modifications are useful in transmitting high torques from a driving member to a driven member. As well known, the shafts of the driving and driven members rotate through whirl modes as the speed of the shafts increase. At each of these modes the rotation of the shafts are said to be operating at critical speeds, and at such speeds undesirable resonances can result.

In accordance with the present invention, the speeds at which the whirl speed modes occur, and in particular the range of subcritical speeds can be adjusted, i.e., either increased or decreased, by merely changing the radial compressive spring rate of the laminated bearing units 58 and 82 in the plunging joint and laminated bearing units 110 and 128 of the fixed joint. This can be accomplished by, for example, varying the durometer of the elastomeric layers of each of the bearings. In this manner, the coupling can be "tuned" to exhibit the whirl speed modes at predetermined speeds.

Figure 8:
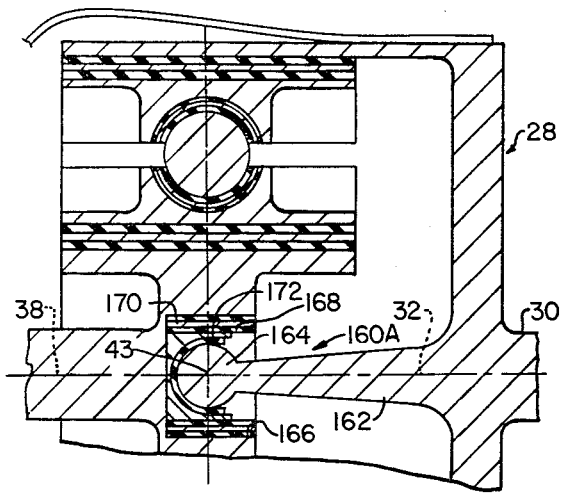
FIG. 8 is a partially cut away, longitudinal, cross-sectional view similar to FIG. 4, showing a modification of the plunging joint embodiment of FIGS. 2 and 4.
Figure 9:
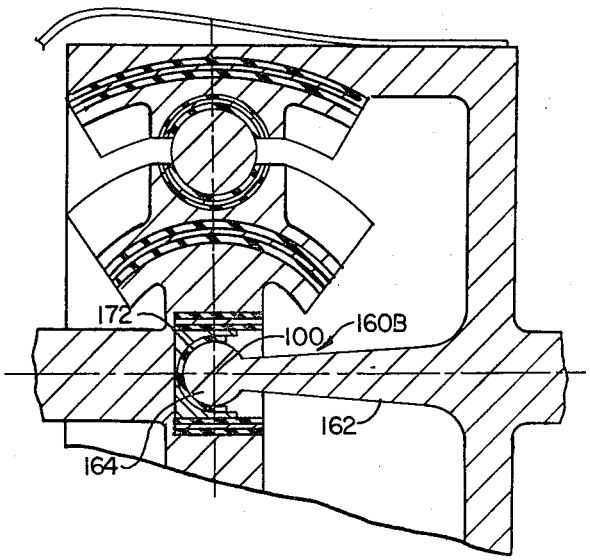
FIG. 9 is a partially cut away, longitudinal, cross-sectional view similar to FIG. 5 showing a modification of the fixed joint embodiment of FIGS. 3 and 5.

Alternatively, the first whirl speed mode can be changed by modifying the geometry of the plunging and fixed joints as shown in FIGS. 8 and 9. More specifically, the means for modifying the angular speed at which the first whirl speed mode occurs is generally referred to at 160A in FIG. 8 and 160B in FIG. 9.

Referring to FIG. 8, the means 160A comprises an elongated connecting member 162 secured at one end to the driven member 28 so that the elongated axis of the member 162 is aligned with the rotation axis 32. The opposite end of member 162 is provided with a spherical ball 164. The driven member 16 is provided with a cylindrical aperture 166 coaxially aligned with the rotation axis 38 and sized to receive a cylindrical element 168. Element 168 is made of a rigid nonextensible material. Bearing means, preferably a cylindrical laminated bearing unit 170 is secured between and preferably bonded to the outer cylindrical surface of the element 168 and the inner opposing surface of the aperture 166. Cylindrical element 168 receives the ball 164 so that the center of the ball is coincident with the center point 43 and the member 162 can pivot within the coupling about that point when angular misalignment between axes 32 and 38 occur. An elastomeric bearing unit 172 can be used between the ball 164 and element 168. Although bearing units 170 and 172 are preferably laminated elastomeric bearing units, they can alternatively be each single layers of elastomer or hard, lubricated-type bearings. Generally, bearing 170 will carry in shear, plunging motion of the element 168, ball 164 and member 162 in the aperture 166. An identical modification can be made to each of the joints shown in FIGS. 6 and 7.

A similar modification also can be made to the fixed joint shown in FIG. 9. In this embodiment since the joint is axially fixed and no axial misalignment will be accommodated, the means 160B is substantially identical to the means 160A shown in FIG. 8 except that the element 168 and laminated bearing unit 170 are eliminated. In this instance the ball 164 is mounted in a cylindrical aperture of the member 16 with an elastomeric bearing unit 172 therebetween. The center of the ball is coincident with the center 100.

It will be appreciated that in addition to increasing the range of subcritical speeds the member 162 of both FIGS. 8 and 9 also provides an additional connection between two torque transmitting members providing a safety measure should one or more of the balls 66 of 114 fail.

It should be appreciated that although various structure in each of the Figs. is described as part of the driving member and other structure described as part of the driven member, the couplings would work equally as well in reverse. Further, various changes may be made in the embodiments described without departing from the invention. For example, the radial, U-shaped cross-sectional shapes of the various laminated bearing units 58, 82, 110 and 128 and the surfaces to which they are bonded can be modified. For example, although units 58 and 82 each is shown having a rectangular, U-shaped radial cross section, the units each can be made to have a semicircular cross section. Similarly, units 110 and 128 each shown as having a semicircular U-shaped cross section can be made to have a rectangular U-shaped cross section.

The invention has various advantages. By utilizing laminated bearing units, the lubrication requirements are eliminated, substantially all friction and heat between the bearing surfaces are substantially eliminated, generated noise and vibration is substantially eliminated, manufacturing tolerance requirements are relaxed, and backlash at low reverse torques is substantially eliminated. By utilizing the connecting member 162, the whirl mode speeds can be modified. Still other advantages will be obvious to persons skilled in the art.

What is claimed is:

1. A coupling device comprising
   a driving member mounted for rotation about a first rotation axis;
   a driven member mounted for rotation about a second rotation axis;

first means rotatable with said driving member and including a first plurality of grooves;

second means rotatable with said driven member and including a second like plurality of grooves, each groove of said second plurality respectively opposing a respective one of said first plurality;

a like plurality of balls, each disposed in a respective groove of said first plurality and the respective opposing groove of said second plurality so as to operatively couple said driving member to said driven member;

first laminated bearing means including alternating layers of resilient and nonextensible materials disposed between said driving member and said first means;

second laminated bearing means including alternating layers of resilient and nonextensible materials disposed be-tween said driven member and said second means;

said first and second laminated bearing means being capable of carrying in compression torque transmitted from said driving member to said driven member, said first laminated bearing means carrying in shear, relative shearing motion between said driving member and said first means, and said second laminated bearing means carrying in shear relative shearing motion between said driven member and said second means.

2. The coupling device according to claim 1, wherein said first laminated bearing means carries in shear pivotal motion about the intersection point of said first and second rotation axes between said driving member and said first means, and said second laminated bearing means carries in shear pivotal motion about the intersection point of said first and second rotation axes between said driven member and said second means.

3. The coupling device according to claim 2, wherein said balls each have a geometric center, the geometric center of each of said balls lying in a single plane which bisects the intersection point of said first and second rotation axes regardless of said pivotal motion.

4. The coupling device according to claim 2, wherein the angular spring rate of each of said first and second laminated bearing means about the intersection point of said first and second rotation axes are equal.

5. The coupling device according to claim 2, wherein said first laminated bearing means includes a first plurality of laminated bearing units each secured between said driving member and said first means and radially spaced from a corresponding one of said balls, said second laminated bearing means includes a second like plurality of laminated bearing units each secured between said driven member and said second means and radially spaced from a corresponding one of said balls opposite the respective one of said first plurality of laminated bearing units.

6. The coupling device according to claim 5, wherein each said first plurality of units is curved in an axial direction along a circular arcuate path having its center of curvature at said intersection point of said axes, and each of said second plurality of units is curved in an axial direction along a circular arcuate path radially spaced from the circular arcuate path of the corresponding one of said first plurality of units and having its center of curvature at said intersection point of said axes.

7. The coupling device according to claim 6 wherein each of said bearing units has the same angular rate along said circular arcuate path about said intersection point.

8. The coupling device according to claim 6, wherein each of said units is of a U-shaped radial cross-section, open toward the corresponding ball.

9. The coupling device according to claim 8 wherein said U-shaped radial cross-section is rectangular.

10. The coupling device according to claim 8 wherein said U-shaped radial cross-section is semicircular.

11. The coupling device according to claim 10, wherein the center of curvature of each of semicircular U-shaped cross-sections taken through the center of the corresponding ball is radially spaced from the center of said ball.

12. The coupling device according to claim 1, wherein said balls are equiangularly spaced around and equally spaced from each of said first and second axes.

13. The coupling device according to claim 1, wherein said first laminated bearing means carries in shear plunging motion along said first axis between said driving member and said first means and said second laminated bearing means carries in shear plunging motion along said second axis between said driven member and said second means.

14. The coupling device according to claim 13, wherein said first laminated bearing means includes a first plurality of laminated bearing units each secured between said driving member and said first means and radially spaced from a corresponding one of said balls, said second laminated bearing means includes a second like plurality of laminated bearing units each secured between said driven member and said second means and radially spaced from a corresponding one of said balls opposite the respective one of said first plurality of laminated bearing units.

15. The coupling device according to claim 14, wherein ends of said first plurality of units extends parallel to said first axis, and each of said second plurality of units is radially spaced from a corresponding one of said first units and extends parallel to said second axis.

16. The coupling device according to claim 15, wherein each of said units is of a U-shaped radial cross-section open towards the corresponding ball.

17. The coupling device according to claim 16 wherein said U-shaped radial cross-section is rectangular.

18. The coupling device according to claim 16 wherein said U-shaped radial cross-section is semicircular.

19. The coupling device according to claim 13, wherein said driven member is an intermediate member, said coupling further including a second driven member mounted for rotation about a third rotation axis; third means rotatable with said intermediate member and including a third plurality of grooves; fourth means rotatable with said second driven member and including a fourth plurality of grooves, each groove of said fourth plurality respectively opposing a respective one of said third plurality; a like plurality of balls, each disposed in a respective groove of said third plurality and the respective opposing groove of said fourth plurality so as to operatively couple said intermediate member to said second driven member, third laminated bearing means including alternating layers of resilient and nonextensible materials disposed between said intermediate member and said third means; fourth laminated bearing means including alternating layers of resilient and nonextensible materials disposed between said second driven member and said fourth means, said third and fourth laminated bearing means being adapted to carry in compression torque transmitted from said intermediate member to said second driven member, said third laminated bearing means carrying in shear pivotal motion about the intersection point of said second and third axes between said intermediate member and said third means, and said fourth laminated bearing means carries in shear pivotal motion about the intersection point of said second and third axes between said second driven member and said fourth means.

20. The coupling device according to claim 1, further including means for modifying the rotation speed of said driving and driven members at which any whirl mode occurs.

21. The coupling device according to claim 20, wherein said means for modifying includes an elongated connecting member having a spherical ball at one end and secured to one of said driving and driven members so that the elongated axis of said connecting member is coaxial with the corresponding rotation axis, said spherical ball being secured to the other of said driving and driven members so that the center of said ball coincides with the common intersection point of said first and second axes.

22. The coupling device according to claim 1, further including elastomeric bearing means disposed between each of said first plurality of grooves and the respective one of said balls, and between each of said second plurality of grooves and the respective one of said balls.

23. A coupling device comprising:
- a first torque transmitting member mounted for rotation about a first rotation axis;
- a second torque transmitting member mounted for rotation about a second rotation axis, said second torque transmitting member including a portion radially spaced from said second axis and spaced radially outward from a portion of said first torque transmitting member;
- a coupling unit for operatively coupling said first torque transmitting member to said second torque transmitting members, said unit comprising inner race means rotatable with said first torque transmitting member and including a plurality of grooves circumferentially spaced around said first axis, outer race means rotatable with said second torque transmitting member and including a plurality of grooves circumferentially spaced around said second axis and outwardly radially spaced from and opposite to a respective one of the first plurality of grooves a like plurality of balls, each disposed in a respective groove of said first plurality and the respective opposing groove of the second plurality so as to be radially disposed between said first and second means, first laminated bearing means disposed between said first torque transmitting member and said inner race means; second laminated bearing means disposed between said second torque transmitting member and said outer race means
- wherein said first and second laminated bearing means are capable of carrying in compression torque transmitting between said first and second torque transmitting members, said first laminated bearing means accommodating in shear, relative shearing motion between said first torque transmitting member and said inner race means, and said second laminated bearing means accommodating in shear relative shearing motion between said second torque transmitting member and said outer race means.

* * * * *